US010344842B2

(12) United States Patent
Billings et al.

(10) Patent No.: US 10,344,842 B2
(45) Date of Patent: Jul. 9, 2019

(54) MULTI-PIECE SEALING ASSEMBLY

(71) Applicant: GM Global Technology Operations LLC, Detroit, MI (US)

(72) Inventors: Edward J. Billings, Ann Arbor, MI (US); John G. Dorrough, Oak Park, MI (US); Carl Eric Fonville, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 628 days.

(21) Appl. No.: 15/070,786

(22) Filed: Mar. 15, 2016

(65) Prior Publication Data

US 2016/0290509 A1 Oct. 6, 2016

Related U.S. Application Data

(60) Provisional application No. 62/143,308, filed on Apr. 6, 2015.

(51) Int. Cl.
| | |
|---|---|
| *F16H 41/24* | (2006.01) |
| *F16J 15/44* | (2006.01) |
| *F16J 15/3284* | (2016.01) |

(52) U.S. Cl.
CPC .......... *F16H 41/24* (2013.01); *F16J 15/3284* (2013.01); *F16J 15/441* (2013.01)

(58) Field of Classification Search
CPC .. F16H 41/24; F16H 57/04; F16J 15/16; F16J 15/32; F16J 15/3284; F16J 15/441
USPC .................................................. 277/373, 445
See application file for complete search history.

(56) References Cited

U.S. PATENT DOCUMENTS

| | | | |
|---|---|---|---|
| 2,299,813 A | 10/1942 | Franks | |
| 3,360,998 A | 1/1968 | Griffel | |
| 3,887,198 A | 6/1975 | McClure et al. | |
| 4,151,999 A | 5/1979 | Forster et al. | |
| 4,600,201 A | 7/1986 | Loenne et al. | |
| 4,890,849 A * | 1/1990 | Eason ..................... | F16J 15/46 |
| | | | 277/422 |
| 5,104,132 A | 4/1992 | Onoda et al. | |
| 5,405,458 A | 4/1995 | Yamagata et al. | |
| 5,492,336 A | 2/1996 | Barna et al. | |
| 5,558,591 A | 9/1996 | Erickson et al. | |
| 5,713,578 A | 2/1998 | Terao et al. | |
| 5,851,568 A | 12/1998 | Huang | |
| 6,132,844 A | 10/2000 | Altshuler et al. | |
| 6,152,453 A | 11/2000 | Kashima et al. | |
| 6,303,254 B1 | 10/2001 | Yu et al. | |
| 6,418,959 B2 | 7/2002 | Kondo | |
| 6,884,827 B2 | 4/2005 | Ota et al. | |

(Continued)

FOREIGN PATENT DOCUMENTS

| | | |
|---|---|---|
| CN | 102606705 A | 7/2012 |
| CN | 102777598 A | 11/2012 |

(Continued)

*Primary Examiner* — F Daniel Lopez
*Assistant Examiner* — Dustin T Nguyen

(57) ABSTRACT

A multi-piece seal assembly for use in a torque converter of a motor vehicle includes an inner ring, an outer ring, and an elastomer compensation layer disposed between the inner ring and the outer ring. The inner and outer rings are made from a composite wear material. Tabs on the inner and outer ring interlock with matching slots on the elastomer compensation layer.

14 Claims, 6 Drawing Sheets

(56) References Cited

U.S. PATENT DOCUMENTS

| | | |
|---|---|---|
| 7,008,695 B1 | 3/2006 | Clough |
| 7,654,536 B2 | 2/2010 | Umetsu et al. |
| 8,088,496 B2 | 1/2012 | Kariya et al. |
| 9,360,115 B2 * | 6/2016 | Chaplin ............... F16J 15/3208 |
| 2004/0104536 A1 | 6/2004 | Gobeli et al. |
| 2004/0251634 A1 | 12/2004 | Shimazu et al. |
| 2006/0060424 A1 | 3/2006 | Tominaga et al. |
| 2006/0065487 A1 | 3/2006 | Tominaga et al. |
| 2006/0179973 A1 | 8/2006 | Matsufuji et al. |
| 2010/0225067 A1 | 9/2010 | Bailey |

FOREIGN PATENT DOCUMENTS

| | | |
|---|---|---|
| DE | 2743376 A1 | 5/1978 |
| GB | 2314604 A | 1/1998 |

* cited by examiner

MULTI-PIECE SEALING ASSEMBLY

CROSS-REFERENCE TO RELATED APPLICATIONS

This application claims priority to Provisional U.S. Application No. 62/143,308 filed Apr. 6, 2015. The disclosure of the above application is incorporated herein by reference.

FIELD

The invention relates generally to sealing assemblies used in a transmission of a motor vehicle, and more particularly to a multi-piece sealing assembly that prevents fluid draindown in a torque converter.

BACKGROUND

The statements in this section merely provide background information related to the present disclosure and may or may not constitute prior art.

There are many applications where a seal is required between a rotating component and a stationary component, such as in a torque converter, a transmission or an engine. A ring seal is used to seal the rotating component to the stationary component in order to keep fluids on either side of the ring seal from escaping to the other side. The ring seal typically includes a circular member that fits around the stationary component and an outer surface that engages the surface of the rotating component. One complication of the above described ring seal is that the ring seal usually remains stationary relative to the rotating component while still maintaining an effective seal to the rotating component. In this regard, the typical ring seal must keep friction forces between the ring seal and the rotating component to a minimum while still maintaining enough radial force to keep fluid from moving past the ring seal.

One solution known in the art to keeping these radial friction forces to a minimum is to force the ring seal to move in an axial direction against a tab or groove formed on the stationary component. By using axial forces, radial forces can be kept to a minimum. Axial forces typically originate from a pressure differential of the fluid on each side of the ring seal. As the pressure differential changes from one side of the ring seal to the other, the ring seal is able to move from one position sealed against the stationary component to a second position sealed against the stationary component.

However, in certain applications, such as a torque converter, it may be desirable to maintain the seal even when there is a reduction in pressure to the energized side of the seal in order to keep the torque converter filled with hydraulic fluid and improve drivability. Thus, there is a need in the art for a ring seal assembly that maintains sealing during low pressure conditions in a torque converter that accommodates high speed, high temperature, tolerance stack-ups, and high pressure.

SUMMARY

A multi-piece seal assembly for use in a torque converter of a motor vehicle includes an inner ring, an outer ring, and an elastomer compensation layer disposed between the inner ring and the outer ring. The inner and outer rings are made from a composite wear material. Tabs on the inner and outer ring interlock with matching slots in the elastomer compensation layer.

In one aspect, the inner ring is comprised of the same material as the outer ring and wherein the inner ring and the outer ring are comprised of a composite wear material.

In another aspect, the elastomer compensation layer is substantially cylindrical and includes an inner surface that defines a plurality of inner slots and an outer surface that defines a plurality of outer slots.

In another aspect, the inner ring is substantially cylindrical and includes a plurality of outer tabs that are disposed within the inner slots of the elastomer compensation layer.

In another aspect, the outer ring is substantially cylindrical and includes a plurality of inner tabs that are disposed within the outer slots of the elastomer compensation layer.

In another aspect, the inner and outer slots of the elastomer compensation layer are not radially aligned.

In another aspect, the inner and outer slots extend axially from a first side of the elastomer compensation layer to a second side of the elastomer compensation layer.

In another aspect, the inner tabs extend axially from a first side of the outer ring to a second side of the outer ring.

In another aspect, the outer tabs extend axially from a first side of the inner ring to a second side of the inner ring.

In another aspect, the elastomer compensation layer includes a second plurality of outer slots and the outer ring includes a second plurality of inner tabs disposed in the second plurality of outer slots, and each of the second plurality of inner tabs are disposed adjacent and spaced apart from each of the plurality of inner tabs.

In another aspect, the plurality of outer tabs of the inner ring are angularly offset from both the plurality of inner tabs and the second plurality of inner tabs such that each of the outer tabs are equidistant from and angularly between pairs of closely adjacent, spaced apart inner tabs.

In another aspect, the elastomer compensation layer is comprised of a rubber or a polyacrylate.

In another aspect, the outer ring has a smooth outer surface.

Further aspects, examples, and advantages will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
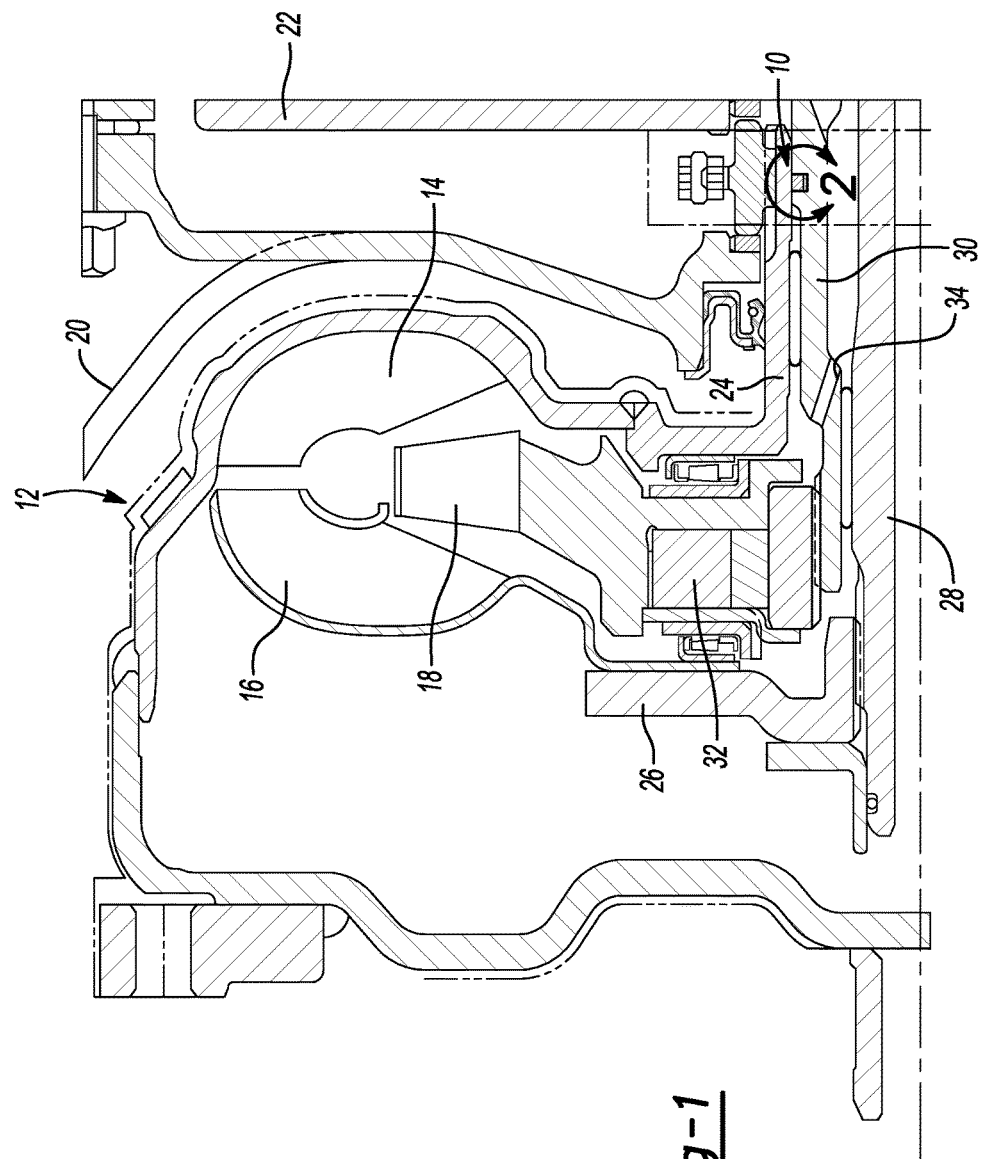
FIG. 1 is a cross-sectional view of a portion of an exemplary torque converter having a multi-piece seal assembly.

With reference to FIG. 1, a multi-piece seal assembly, indicated by reference number 10, is illustrated with an exemplary torque converter 12 in a transmission. A transmission generally includes the torque converter 12, a transmission pump 14, a turbine 16, and a stator 18 contained within a torque converter housing 20. The torque converter housing 20 is coupled to a transmission housing 22. The transmission pump 14 is driven by an engine (not shown) and is connected to a converter hub 24. The converter hub 24 may be connected to and drive a hydraulic pump (not shown). The turbine 16 is connected to a turbine output shaft 26. The turbine output shaft 26 may be connected to and drive a transmission input shaft 28 of a transmission (not shown). The stator 18 is interconnected to a stator shaft 30 of the transmission housing 22 through, for example, a one-way clutch 32. Power is transmitted from the transmission pump 14, driven by the engine, to the turbine 16 through hydraulic fluid. Hydraulic fluid is supplied to the torque converter 12 though a port 34 disposed in the stator shaft 30 of the transmission housing 22.

Figure 2:
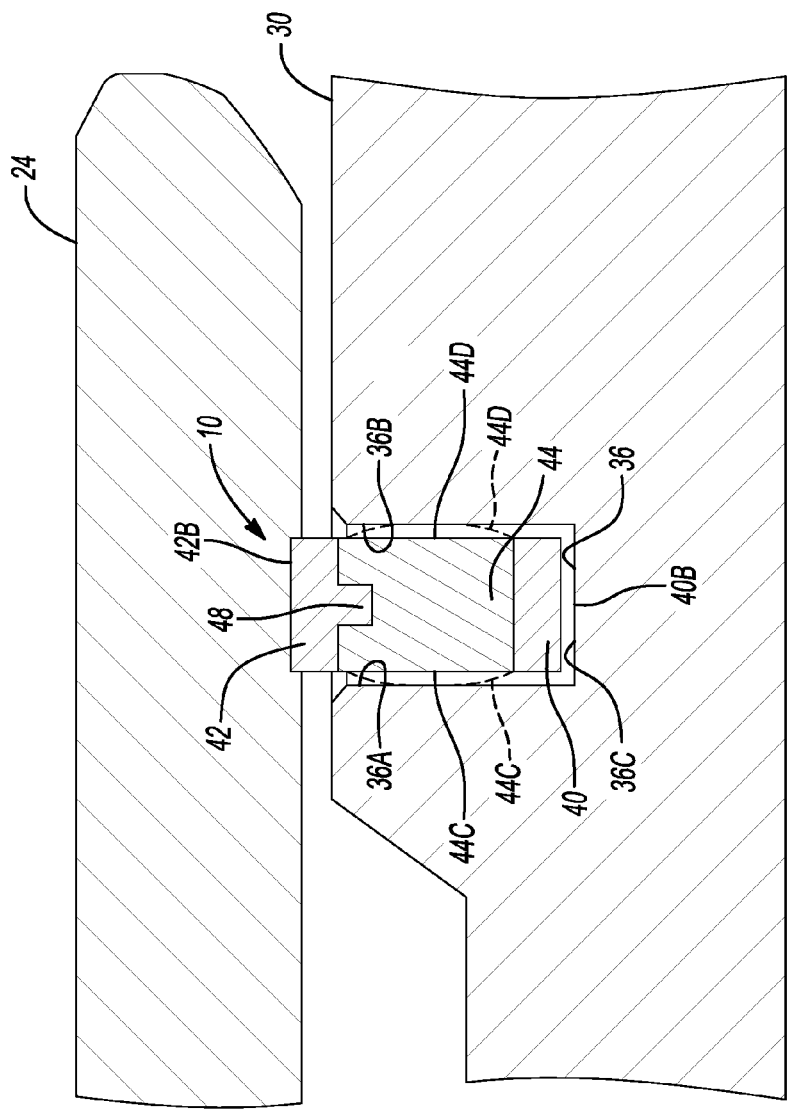
FIG. 2 is an enlarged portion of the torque converter and multi-piece seal assembly indicated by arrows 2-2 in FIG. 1.

Turning to FIG. 2 and with continued reference to FIG. 1, the multi-piece seal assembly 10 seals the converter hub 24 to the stator shaft 30 of the transmission housing 22. The converter hub 24 is concentric and rotatable with respect to the stator shaft 30. The multi-piece seal assembly 10 is disposed within a groove 36 formed in the stator shaft 30. The groove 36 extends around the entire periphery or circumference of the stator shaft 30 and is defined by a first wall 36A, a second wall 36B opposite the first wall 36A, and a base 36C extending between the first wall 36A and the second wall 36B. The groove 38 has a width greater than a width of the multi-piece seal assembly 10.

Figure 3:
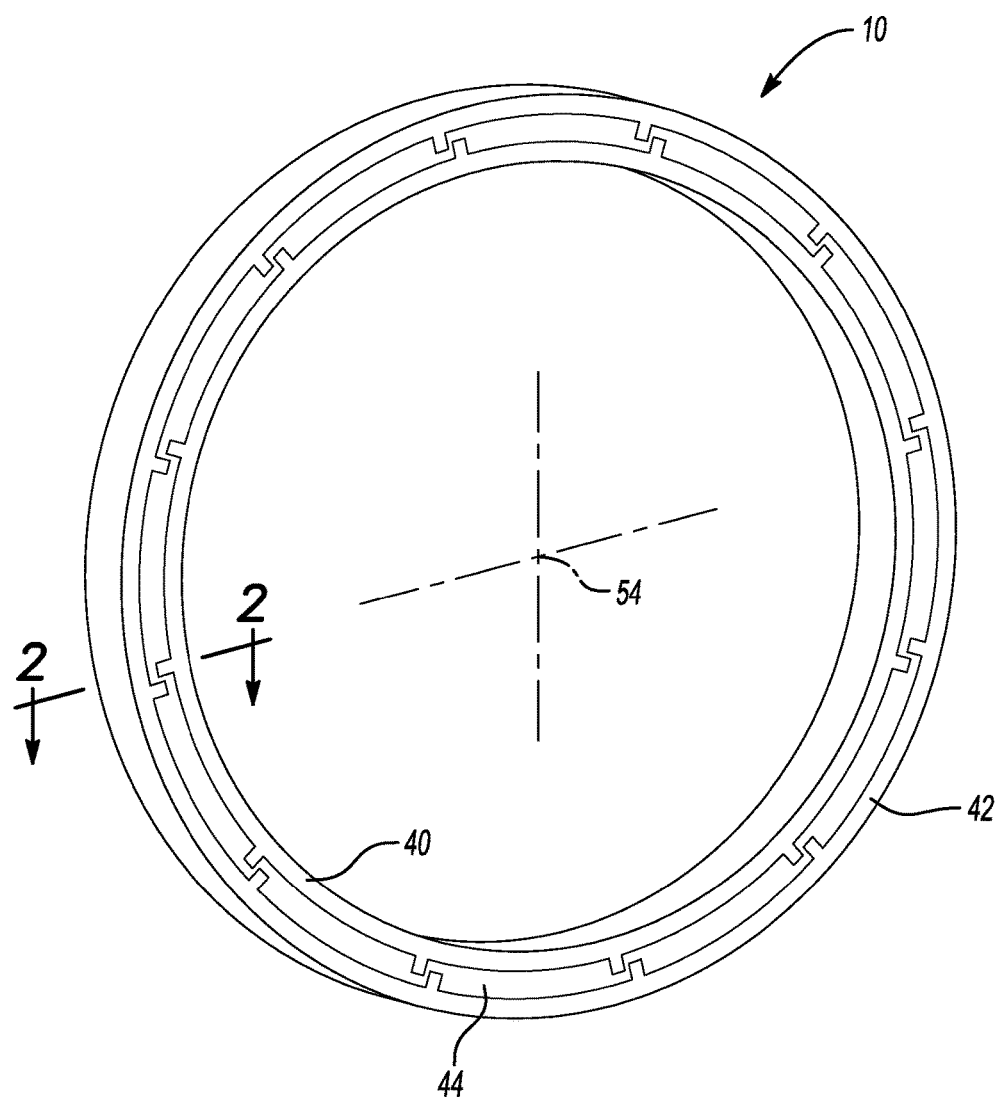
FIG. 3 is an isometric, front view of the multi-piece seal assembly.
Figure 4:
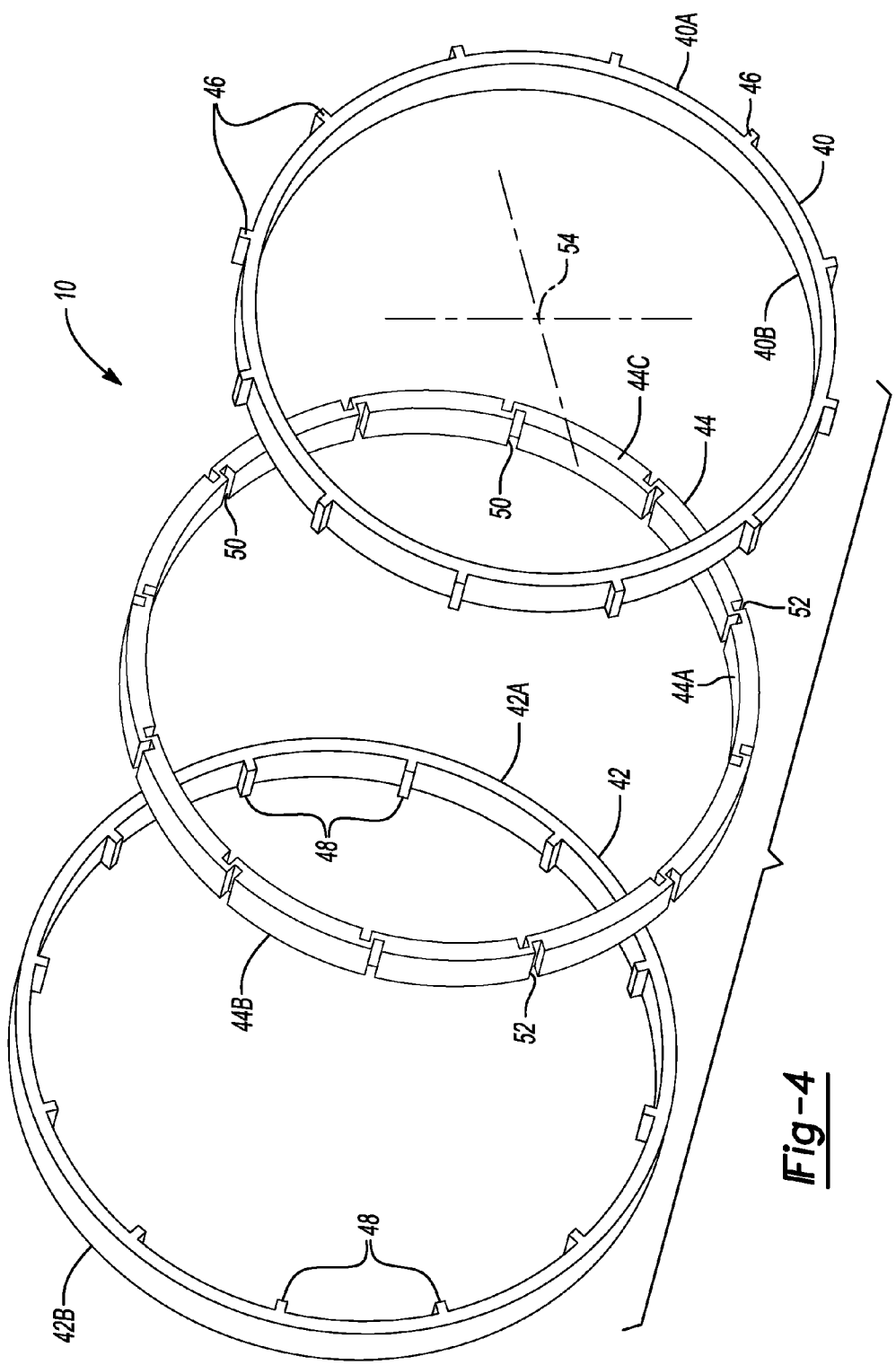
FIG. 4 is an isometric, exploded front view of the multi-piece seal assembly.

With reference to FIGS. 3 and 4, and with continued reference to FIG. 2, the multi-piece seal assembly 10 includes an inner ring 40, an outer ring 42, and an elastomeric center ring or elastomer compensation layer 44 disposed between the inner ring 40 and the outer ring 42. The inner ring 40 is substantially cylindrical and includes an inner surface 40A and an outer surface 40B. The inner ring 40 includes a plurality of outer tabs 46 formed on the outer surface 40B and disposed symmetrically about the circumference of the inner ring 40. The outer tabs 46 extend along the entire axial length of the inner ring 40. The inner ring 40 is made from a composite wear material, such as ETFE, etc. The composite wear material may include fillers, such as glass filling, to increase strength.

The outer ring 42 is substantially cylindrical and includes an inner surface 42A and an outer surface 42B. The outer ring 42 includes a plurality of inner tabs 48 formed on the inner surface 42A and disposed symmetrically about the inner circumference of the outer ring 42. The inner tabs 48 extend along the entire axial length of the outer ring 42. The outer surface 42B of the outer ring 42 is preferably smooth to facilitate rotation of the converter hub 24 with respect to the multi-piece seal assembly 10. The outer ring 42 is made from a composite wear material, such as ethylene tetrafluoroethylene (ETFE), etc. The thermoplastic polymer may include fillers, such as glass filling, to increase strength.

The center ring 44 is substantially cylindrical and includes an inner surface 44A and an outer surface 44B. The center ring 44 includes a plurality of inner slots 50 formed on the inner surface 44A and disposed symmetrically about the inner circumference of the center ring 44. The inner slots 50 extend axially from a first side 44C of the center ring 44 to a second side 44D of the center ring 44. The inner slots 50 are positioned and sized to receive the outer tabs 46 of the inner ring 40 therein. The center ring 44 also includes a plurality of outer slots 52 formed on the outer surface 44B and disposed symmetrically about the outer circumference of the center ring 44. The outer slots 52 are angularly offset from, or have an angular displacement, with respect to the inner slots 50 and relative to a center point 54 of the multi-piece seal assembly 10. The outer slots 52 extend axially from the first side 44C of the center ring 44 to the second side 44D of the center ring 44. The outer slots 52 are positioned and sized to receive the inner tabs 48 of the outer ring 42 therein. The center ring 44 is made from an elastomer compensation layer such as rubber, polyacrylate, etc.

The multi-piece seal assembly 10 may be made by a combination of insert molding/compression or transfer molding. The molding process combines the individual pieces, i.e. the inner ring 40, outer ring 42, and center ring 44 into a single assembly which will then be installed onto the transmission housing 22. The interlocking of the tabs 46, 48 with the slots 50, 52 rotationally binds the inner, outer, and center rings 40, 42, 44 together. In addition, the surfaces 44A, 44B may be bonded to the respective surfaces 40A, 40B, 42A, 42B of the inner and outer rings 40, 42 to further strengthen the multi-piece seal assembly 10.

When installed, the multi-piece seal assembly 10 is under compressive forces from the converter hub 24 and the stator shaft 30. The elastomer compensation layer 44 thus compresses and the side walls 44C, 44D move axially and seal against the walls 36A, 367B of the groove 36, indicated by dashed lines in FIG. 2. Therefore, even if pressure is reduced on the energized side of the multi-piece seal assembly 10, the multi-piece seal assembly maintains a seal between the converter hub 24 and the stator shaft 30 of the transmission housing 22.

Figure 5:
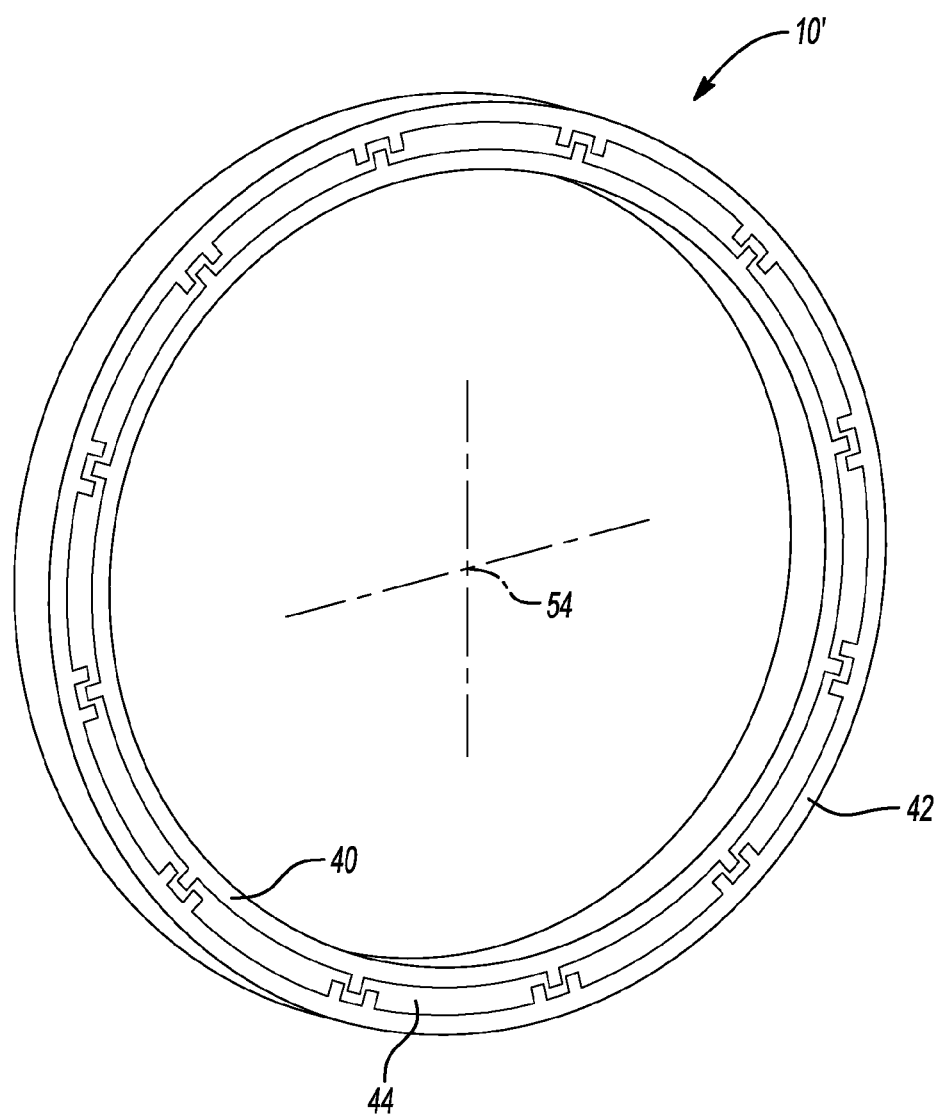
FIG. 5 is an isometric, front view of a second multi-piece seal assembly.
Figure 6:
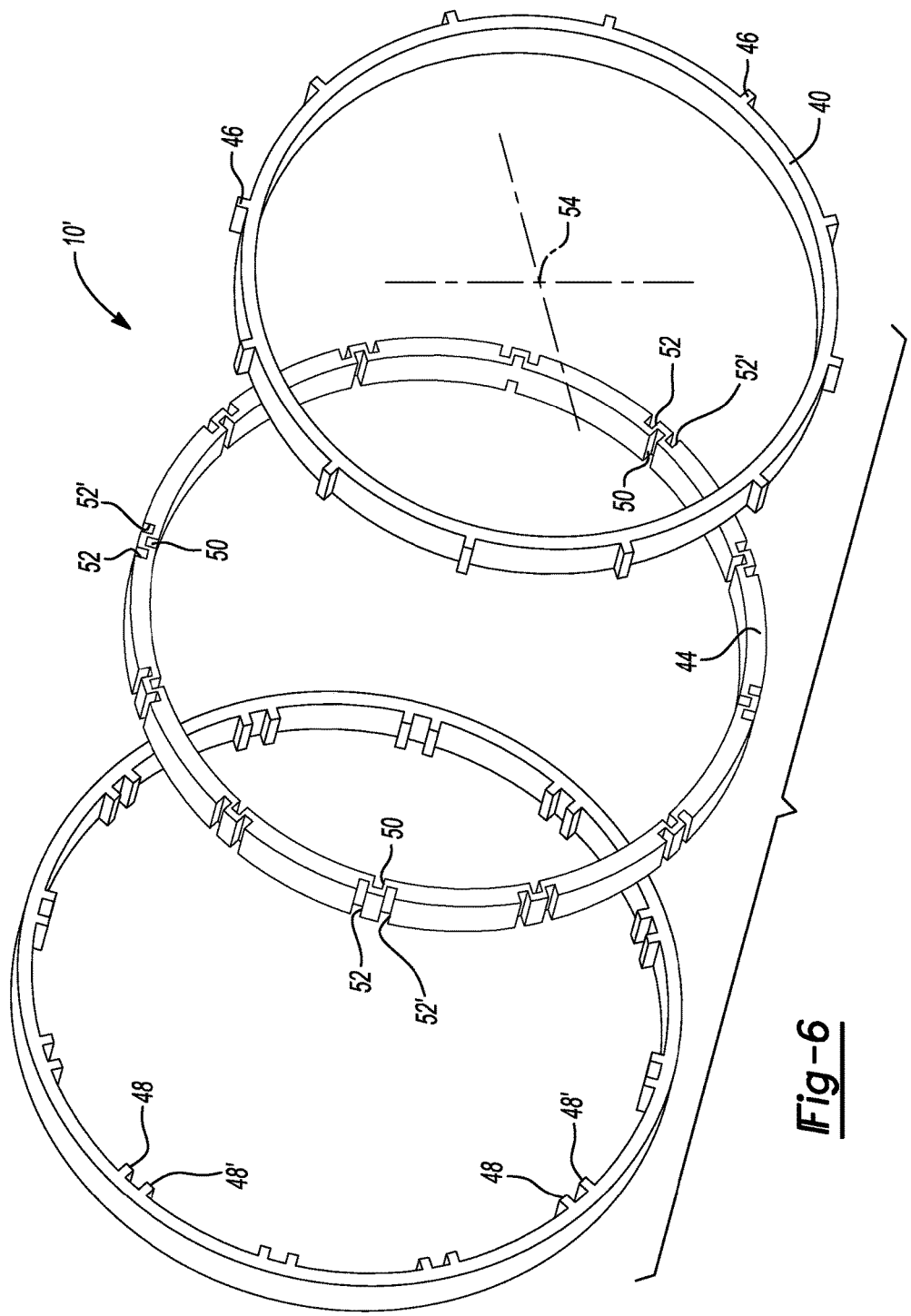
FIG. 6 is an isometric, exploded front view of the second multi-piece seal assembly.

Turning to FIGS. 5 and 6, an alternate multi-piece seal assembly is generally indicated by reference number 10'. The multi-piece seal assembly 10' has certain features in common with the multi-piece seal assembly 10 shown in FIGS. 3-4 and therefore like components are indicated by like reference numbers. However, the outer ring 42 of the multi-piece seal assembly 10' includes a second plurality of inner tabs 48' formed on the inner surface 42A. Each of the second plurality of inner tabs 48' are disposed adjacent and spaced apart from each of the plurality of inner tabs 48. The center ring 44 therefore has a second plurality of slots 52' formed in the outer surface 44B that match the second plurality of inner tabs 48'. The second plurality of slots 52' are each disposed adjacent and spaced apart from the plurality of slots 52. The outer tabs 46 of the inner ring 46 are angularly offset from, or have an angular displacement, with respect to both the first and second inner tabs 48, 48' and relative to the center point 54 such that each of the outer tabs 46 are equidistant from and angularly between pairs of closely adjacent, spaced apart first and second inner tabs 48, 48'.

The description of the invention is merely exemplary in nature and variations that do not depart from the gist of the invention are intended to be within the scope of the invention. Such variations are not to be regarded as a departure from the spirit and scope of the invention.

The following is claimed:

1. A seal assembly for use in a torque converter of a motor vehicle, the seal assembly comprising:
   an inner ring;
   an outer ring;
   an elastomer compensation layer disposed between the inner ring and the outer ring, wherein the elastomer compensation layer is substantially cylindrical and includes an inner surface that defines a plurality of inner slots and an outer surface that defines a plurality of outer slots, wherein the inner ring is substantially cylindrical and includes a plurality of outer tabs that are disposed within the plurality of inner slots of the elastomer compensation layer and the outer rind is substantially cylindrical and includes a plurality of inner tabs that are disposed within the plurality of outer slots of the elastomer compensation layer, wherein the elastomer compensation layer includes a second plurality of outer slots and the outer rind includes a second plurality of inner tabs disposed in the second plurality of outer slots, and each of the second plurality of inner tabs are disposed adjacent and spaced apart from each of the plurality of inner tabs, and wherein the plurality of outer tabs of the inner rind are angularly offset from both the plurality of inner tabs and the second plurality of inner tabs such that each of the outer tabs are equidistant from and angularly between pairs of closely adjacent, spaced apart inner tabs.

2. The seal assembly of claim 1 wherein the inner ring is comprised of the same material as the outer ring and wherein the inner ring and the outer ring are comprised of a composite wear material.

3. The seal assembly of claim 1 wherein the inner and outer slots of the elastomer compensation layer are not radially aligned.

4. The seal assembly of claim 1 wherein the inner and outer slots extend axially from a first side of the elastomer compensation layer to a second side of the elastomer compensation layer.

5. The seal assembly of claim 1 wherein the inner tabs extend axially from a first side of the outer ring to a second side of the outer ring.

6. The seal assembly of claim 5 wherein the outer tabs extend axially from a first side of the inner ring to a second side of the inner ring.

7. The seal assembly of claim 1 wherein the elastomer compensation layer is comprised of a rubber or a polyacrylate.

8. The seal assembly of claim 1 wherein the outer ring has a smooth outer surface.

9. A seal assembly for use in a torque converter of a motor vehicle, the seal assembly comprising:
an elastomer compensation ring having an inner surface that defines a plurality of inner slots and an outer surface that defines a plurality of outer slots
an inner ring disposed within the elastomer compensation ring and having a plurality of outer tabs formed on an outer surface of the inner ring, wherein each of the plurality of outer tabs is disposed in one of the plurality of inner slots of the elastomer compensation ring; and
an outer ring disposed around the elastomer compensation ring and having a plurality of inner tabs formed on an inner surface of the outer ring, wherein each of the plurality of inner tabs is disposed in one of the plurality of outer slots of the elastomer compensation ring, and wherein the plurality of inner and outer slots of the elastomer compensation ring are not radially aligned.

10. The seal assembly of claim 9 wherein the inner ring is comprised of the same material as the outer ring, the elastomer compensation ring is comprised of a material different than the inner ring and outer ring, and wherein the inner ring and the outer ring are comprised of a composite wear material.

11. The seal assembly of claim 9 wherein the inner and outer slots extend axially from a first side of the elastomer compensation ring to a second side of the elastomer compensation ring.

12. The seal assembly of claim 9 wherein the inner tabs extend axially from a first side of the outer ring to a second side of the outer ring.

13. The seal assembly of claim 9 wherein the outer tabs extend axially from a first side of the inner ring to a second side of the inner ring.

14. An assembly in a transmission of a motor vehicle, the motor vehicle having an engine, the assembly comprising:
a transmission pump connected to the engine;
a converter hub connected to the transmission pump;
a turbine hydraulically driven by the converter hub;
a turbine output shaft connected to the turbine;
a stator shaft concentric to the converter hub, the stator shaft having a port and having a groove formed along a circumference of the stator shaft, wherein the groove is disposed radially between the port and the turbine; and
a seal assembly disposed in the groove of the stator shaft, the seal assembly having an elastomer compensation ring having an inner surface that defines a plurality of inner slots and an outer surface that defines a plurality of outer slots, an inner ring disposed within the elastomer compensation ring and having a plurality of outer tabs formed on an outer surface of the inner ring, wherein each of the plurality of outer tabs is disposed in one of the plurality of inner slots of the elastomer compensation ring, and an outer ring disposed around the elastomer compensation ring and having a plurality of inner tabs formed on an inner surface of the outer ring, wherein each of the plurality of inner tabs is disposed in one of the plurality of outer slots of the elastomer compensation ring, and wherein the outer ring is in contact with the converter hub and the inner ring is in contact with the stator shaft, and the elastomeric compensation ring is deformed and contacts a pair of side walls of the groove.

* * * * *